(12) United States Patent
Tanaka (10) Patent No.: US 7,636,521 B2
(45) Date of Patent: Dec. 22, 2009

(54) CAMERA SYSTEM OF DETACHABLE LENS UNIT

(75) Inventor: Hiroshi Tanaka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 423 days.

(21) Appl. No.: 11/640,288

(22) Filed: Dec. 18, 2006

(65) Prior Publication Data

US 2007/0140681 A1    Jun. 21, 2007

(30) Foreign Application Priority Data

Dec. 21, 2005  (JP)  ............... 2005-368360

(51) Int. Cl.
*G03B 7/26* (2006.01)
(52) U.S. Cl. .................. 396/303; 396/532; 348/211.14; 348/333.04
(58) Field of Classification Search .................. 396/303
See application file for complete search history.

(56) References Cited

U.S. PATENT DOCUMENTS 4,782,393 A * 11/1988 Kawamura ............. 348/211.14

7,496,292 B2 * 2/2009 Watanabe ................... 396/301

FOREIGN PATENT DOCUMENTS

| JP | 6-178178 A | 6/1994 |
|---|---|---|
| JP | 2001-066489 A | 3/2001 |
| JP | 2002-72052 A | 3/2002 |

* cited by examiner

*Primary Examiner*—W B Perkey
*Assistant Examiner*—Bret Adams
(74) *Attorney, Agent, or Firm*—Sughrue Mion, PLLC (57) ABSTRACT

When an UNREG voltage is equal to or less than a PREEND voltage, a notification for informing this state is sent from a lens-side CPU of a lens unit to a body-side CPU of a camera body by UART communication. At this time, the body-side CPU displays a warning, which informs that remaining battery is small, on an LCD. When the UNREG voltage is equal to or less than an END voltage, a notification for informing this state is sent to the body-side CPU 25 by the UART communication. At this time, the lens-side CPU waits until the body-side CPU turns off a power supply of the lens unit. The body-side CPU stops supplying electricity to the lens unit and displays a warning, which informs that the battery runs out, on the LCD. After that, the body-side CPU turns off a power supply of the camera body.

7 Claims, 10 Drawing Sheets

CAMERA SYSTEM OF DETACHABLE LENS UNIT

FIELD OF THE INVENTION

The present invention relates to a camera system in which one of lens units of different kinds is selected and the selected lens unit is detachably attached to a camera body.

BACKGROUND OF THE INVENTION

There is a known camera system in which one of lens units of different kinds is selected and the selected lens unit is detachably attached to a camera body. For instance, in an image processing system described in Japanese Patent Laid-Open Publication No. 06-178178, an imaging device including an image sensor is detachably attached to an information processor including a keyboard, a display, a controller and a power source. At this system, electric power is supplied from the power source to the imaging device.

A camera system described in Japanese Patent Laid-Open Publication No. 2001-066489 comprises a voltage VC memory circuit for storing a check voltage guaranteeing operations of all functions of the system, a voltage detection circuit for detecting a power-supply voltage, a current LA memory circuit for storing a maximum rated current allowed to be supplied to an interchangeable lens, and a camera controlling circuit for controlling the camera. The camera controlling circuit sends a value, which relates to the maximum rated current of the current LA memory circuit, to the interchangeable lens and compares a voltage value detected by the voltage detection circuit with the check voltage of the voltage VC memory circuit of a camera body. On the basis of a comparison result, a condition of battery capacity is displayed and a lens controlling circuit controls a lens drive mechanism within a range concerning the maximum rated current received from the camera body.

In the meantime, as to an interchangeable lens camera described in Japanese Patent Laid-Open Publication No. 2002-072052, a function for monitoring a power-supply voltage is provided in an interchangeable lens. On the basis of a value of the power-supply voltage applied to the lens, a waiting state and an operating state of the lens are changed to save electric power.

In both the inventions described in the above-noted Publication Nos. 06-178178 and 2001-066489, since the camera body monitors the power-supply voltage of the entire system, it is necessary to commonly set a minimum operating voltage of the camera body and minimum voltages capable of operating interchangeable lens groups and interchangeable imaging units. When the minimum operating voltages differ in accordance with lens types and when the minimum operating voltage of the lens is different from that of the camera body, it is impossible to manage the power-supply voltage of the entire system. Further, even if the minimum operating voltage is commonly set, it is necessary to determine a threshold in consideration of, for example, a margin of voltage drop of mount contact points provided between the lens and the camera body, because contact resistance of the contact point changes due to deterioration of the mount contact point with time, wear thereof, change of pressing force thereof, and so forth. There is a possibility that maximum number of shooting to be set by one-time charging reduces.

By combining the invention of the above Publication No. 2002-072052 with the inventions of the above Publication Nos. 06-178178 and 2001-066489, the lens is adapted to be capable of monitoring the power-supply voltage of itself and it is possible to solve the shortcomings of the invention described in the above Publication Nos. 06-178178 and 2001-066489 in that the minimum operating voltages differ in accordance with the lens types and the voltage drop varies at the mount contact point. However, even if the invention of the Publication No. 2002-072052 is applied to the inventions of the Publication Nos. 06-178178 and 2001-066489, since the lens and the camera body independently monitor the power-supply voltage, it is necessary to notify a monitoring result to a user by each of the lens and the camera body. For this reason, the lens and the camera body respectively need a display function and a warning-beep generating function. Consequently, the entire system becomes very redundant. What the user desires to know is the state of the battery capacity of the entire system. When the display is independently performed by each of the lens and the camera body, it is troublesome to confirm the display and there is no advantage for the user.

SUMMARY OF THE INVENTION

In view of the foregoing, it is a primary object of the present invention to provide a camera system in which it is possible to manage an optimum power-supply voltage even if minimum operating voltages of lens units and a camera body differ in accordance with types of the lens units and voltage drop is caused due to mount contact points.

In order to achieve the above and other objects, the camera system according to the present invention comprises a lens unit and a camera body to which the lens unit is detachably attached via amount. The lens unit includes an image sensor for converting an optical image formed by a taking lens into an image signal. The camera body includes a power source. The lens unit comprises a lens-side voltage-measuring part, a lens-side memory, a lens-side voltage-comparing part, and a lens-side communication part. The lens-side voltage-measuring part measures a voltage of electric power supplied from the power source of the camera body via a mount contact provided on the mount. The lens-side memory stores a lens-side threshold voltage, which guarantees an operation of the lens unit, in advance. The lens-side voltage-comparing part compares a measured voltage of the lens-side voltage-measuring part with the lens-side threshold voltage read out of the lens-side memory. The lens-side communication part sends a lens-side comparison result of the lens-side voltage-comparing part to the camera body via the mount contact. The camera body comprises a body-side communication part and a display. The body-side communication part receives the lens-side comparison result sent from the lens-side communication part. The display shows the lens-side comparison result.

In another embodiment, the camera system comprises a lens unit and a camera body to which the lens unit is detachably attached via amount. The lens unit includes an image sensor for converting an optical image formed by a taking lens into an image signal. The camera body includes a memory for storing the image signal sent from the lens unit. The lens unit comprise salens-side power source, a lens-side voltage-measuring part, a lens-side memory, a lens-side voltage-comparing part, and a lens-side communication part. The lens-side power source supplies electric power to each part of the lens unit. The lens-side voltage-measuring part measures a voltage of the lens-side power source. The lens-side memory stores a lens-side threshold voltage, which guarantees an operation of the lens unit, in advance. The lens-side voltage-comparing part compares a measured voltage of the lens-side voltage-measuring part with the lens-side threshold voltage read out of the lens-side memory. The lens-side communication part sends a lens-side comparison result of the lens-side voltage-comparing part to the camera body via a mount contact provided on the mount. The camera body comprises a body-side power source, a body-side communication part, a body-side voltage-measuring part, a body-side memory, a body-side voltage-comparing part, and a display. The body-side power source supplies electric power to each part of the camera body. The body-side communication part receives the lens-side comparison result sent from the lens-side communication part. The body-side voltage-measuring part measures a voltage of the body-side power source. The body-side memory stores a body-side threshold voltage, which guarantees an operation of the camera body, in advance. The body-side voltage-comparing part compares a measured voltage of the body-side voltage-measuring part with the body-side threshold voltage read out of the body-side memory. The display shows a warning in accordance with each of a body-side comparison result of the body-side voltage-comparing part and the lens-side comparison result.

It is preferable that the camera body sends an acknowledge signal of the lens-side comparison result to the lens unit when receiving the lens-side comparison result representing that the measured voltage of the lens unit is equal to or less than the lens-side threshold voltage. Upon receiving the acknowledge signal, the lens unit stops supplying the electric power of the power source to each part of the lens unit. In this case, it is prevented that the power supply of the lens unit is turned off without knowledge of the camera body.

It is also preferable that the lens unit and the camera body include image-transfer communication parts which are used for transferring the image signal to the camera body and are provided separately from the lens-side communication part and the body-side communication part. In this case, it is prevented that the lens-side comparison result is not sent to the camera body due to a busy state of the communication passage.

DESCRIPTION OF THE PREFERRED EMBODIMENTS

Figure 1:
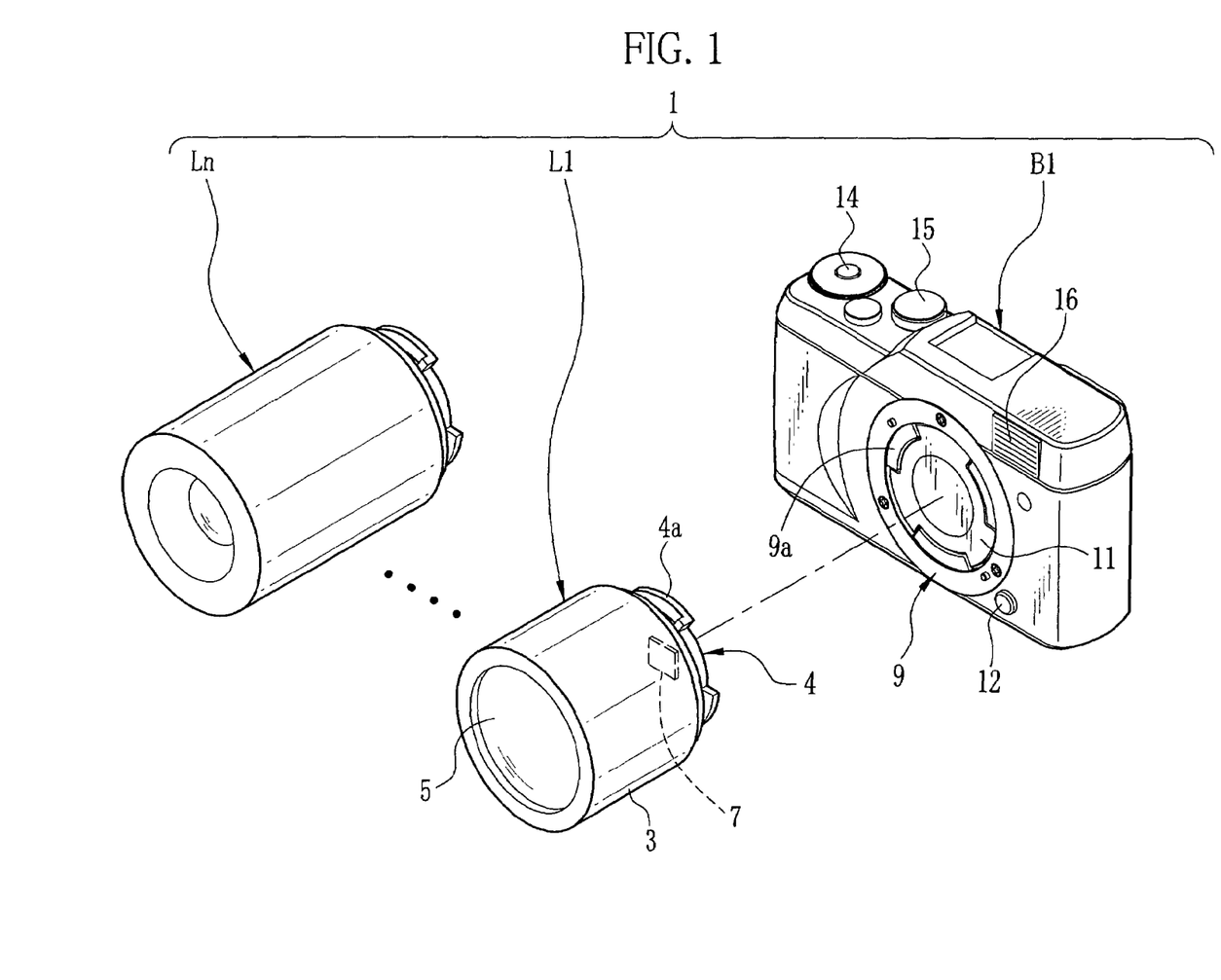
FIG. 1 is a perspective view showing a camera system according to the present invention.

In FIG. 1 showing a camera system 1 according to the first embodiment of the present invention, the camera system 1 comprises plural kinds of lens units L1 to Ln (n is an integer) and a camera body B1. The lens units L1 to Ln include imaging optical systems and image sensors to produce image signals. The image sensors and so forth of the lens units L1 to Ln have different specifications. One of the lens units L1 to Ln is detachably attached to the camera body B1 in which the image signal is received from the attached lens unit. The camera body B1 records the received image signal in a memory card and/or displays an image on an LCD. Incidentally, although illustration is abbreviated, an external flash device may be added to the lens units L1 to Ln and the camera body B1.

In the following description, the lens unit L1 selected from among the lens units L1 to Ln is attached to the camera body B1 to constitute the camera system 1. Incidentally, a basic structure of the lens unit L1 is common to all the lens units L1 to Ln. However, configurations of the imaging optical systems differ and CCDs also differ. In addition, combinations of the imaging optical systems and the CCDs differ.

The lens unit L1 comprises a barrel 3 and a lens-side mount portion 4. The barrel 3 contains the imaging optical system 6 (see FIG. 3) including a taking lens 5, the CCD (image sensor) 7, a circuit board and so forth. On the circuit board, are mounted a drive circuit for driving the CCD 7 and a processing circuit for the image signal outputted from the CCD 7. These components are connected to a lens-side mount contact 8 disposed at the lens-side mount portion 4.

The lens-side mount portion 4 comprises three lens-side bayonet claws 4a. A body-side mount portion 9 is disposed at the front of the camera body B1. The body-side mount portion 9 comprises three body-side bayonet claws 9a corresponding to the lens-side bayonet claws 4a. Upon rotating the lens-side bayonet claws 4a of the lens-side mount portion 4 along the body-side bayonet claws 9a of the body-side mount portion 9, the lens unit L1 is mechanically attached to the camera body B1. At the same time, the lens-side mount contact 8 comes into contact with a body-side mount contact 10 built in the body-side mount portion 9 so that the lens unit L1 is electrically connected to the camera body B1.

Via the lens-side mount contact 8 and the body-side mount contact 10, electricity is supplied from the camera body B1 to the lens unit L1. Further, communications of image data, control commands and events are performed.

The inside of the body-side mount portion 9 is provide with a mount lid 11 biased by a coil spring in a forward direction. When the lens unit is detached, the mount lid 11 prevents dust from entering the camera body B1. Meanwhile, a lock release button 12 is disposed near the body-side mount portion 9. Upon a press of the lock release button 12, the lens unit L1 is unlocked so that the lens unit L1 can be detached.

A top surface of the camera body B1 is provided with a release button 14 and a mode switching dial 15. The release button 14 is depressed at a shooting time. The mode switching dial 15 is handled when to change a still-image shooting mode, a moving-image shooting mode, a reproduction mode and a setup mode. A front surface of the camera body B1 is provided with a flash emitter 16. Incidentally, the release button 14 is adapted to be depressed in two steps of half depression and full depression. When the release button 14 is depressed halfway, a switch S1 incorporated therein is turned on. When the release button 14 is fully depressed, a switch S2 is turned on. Meanwhile, a lateral surface of the camera body B1 is provided with a slot 75 for loading a memory card 76 thereinto (see FIG. 3).

Figure 2:
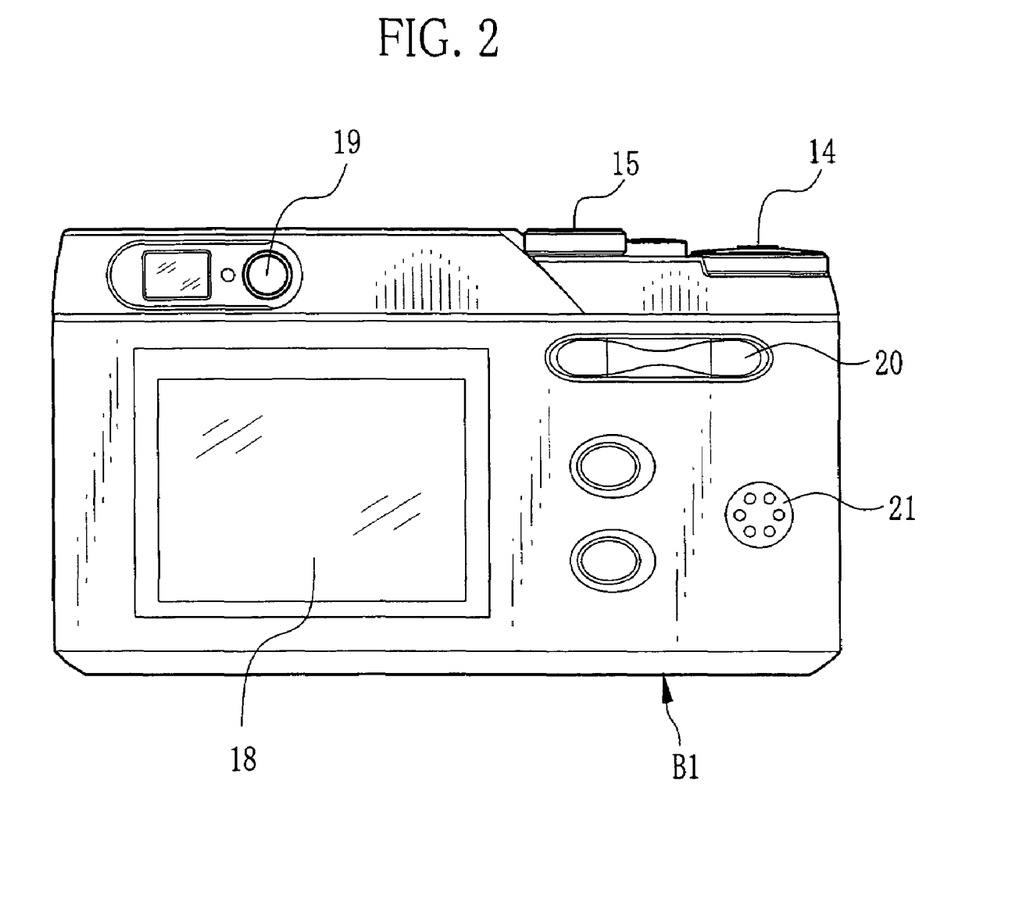
FIG. 2 is a plan view showing a rear surface of a camera body.

As shown in FIG. 2, a rear surface of the camera body B1 is provided with an LCD 18, a power switch 19 (see FIG. 3), a zoom lever 20 and a speaker 21. The zoom lever 20 is used for a zooming operation and for moving a cursor at a time of the setup mode. The speaker 21 emits sounds of a warning beep and so forth. On the LCD 18, shooting images and various setting conditions are displayed. In addition, warnings are also displayed on the LCD 18. The warnings inform a PREEND state, in that remaining charge of a battery 22 (see FIG. 3) loaded in the camera body B1 is small, and an END state, in that the charge of the battery runs out. The warnings to be displayed are such that "Remaining battery is small" and "Battery runs out". Incidentally, instead of the warnings, the battery 22 may be illustrated and the illustrated battery may be changed or blinked.

The END state is defined as a condition in that a voltage of the battery 22 falls below a minimum operation-guarantee voltage (END voltage), which is a threshold guaranteeing operations. The PREEND state is defined as a condition in that the voltage of the battery 22 falls below a remaining-battery warning voltage (PREEND voltage), which is a threshold (0.5V, for instance) set so as to be slightly higher than the END voltage for the purpose of warning that the remaining battery is small. Incidentally, the lens units L1 to Ln and the camera body B1 have different END voltages and different PREEND voltages.

Figure 3:
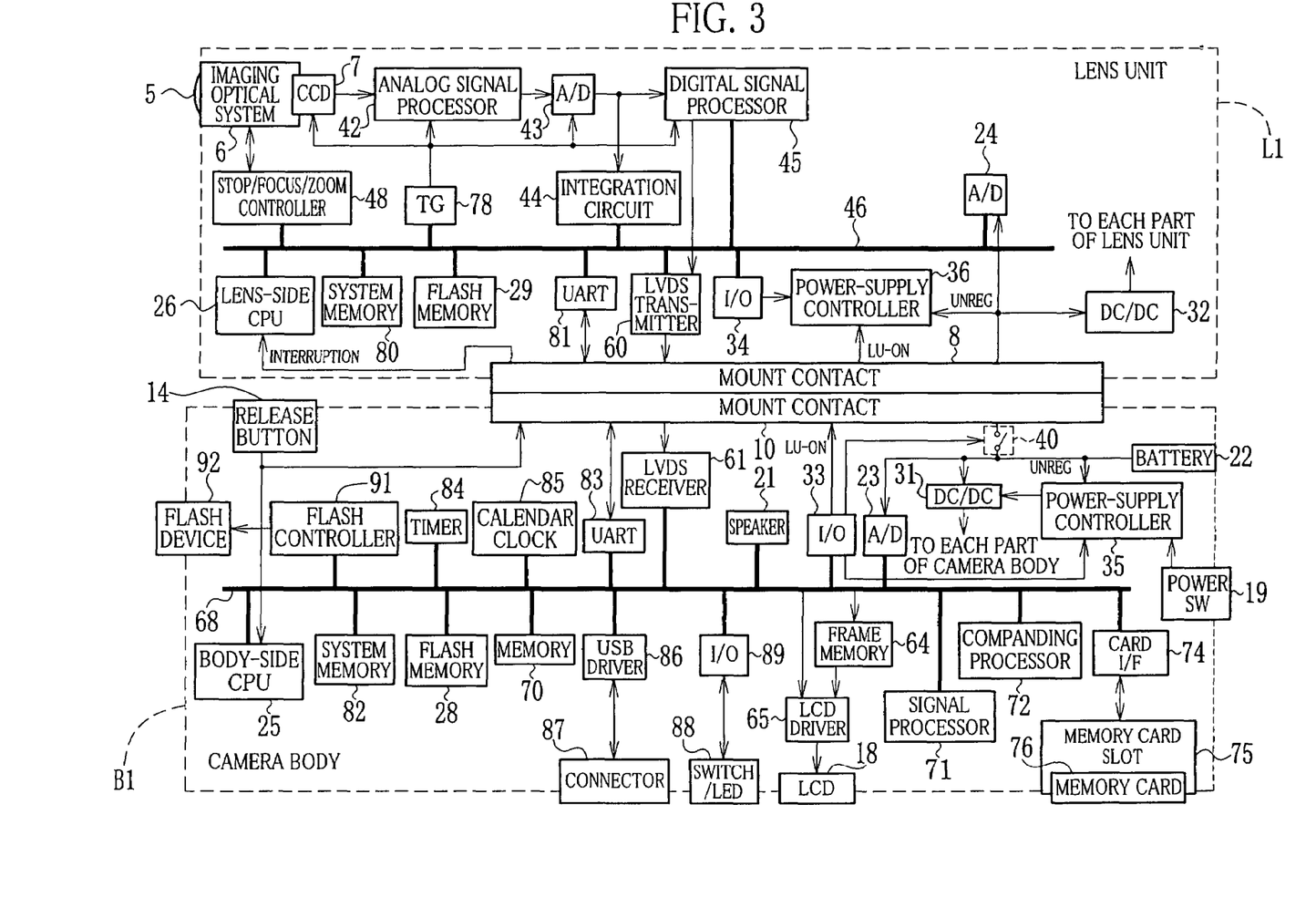
FIG. 3 is a block diagram showing an electrical structure of the camera system of the first embodiment.

FIG. 3 shows an electrical structure of the lens unit L1 and the camera body B1. In FIG. 3, the lens unit L1 and the camera body B1 are electrically connected by the lens-side mount contact 8 and the body-side mount contact 10. Between the mount contacts 8 and 10, the image data is transferred from the camera body B1 to the lens unit L1 by one-way LVDS (Low Voltage Differential Signaling) communication. Further, the control command and the event are transmitted by two-way UART (Universal Asynchronous Receiver Transmitter) communication. In addition, various signals and a battery current pass between the mount contacts 8 and 10. In this regard, the various signals include a depression signal of the release button 14 and an LU-ON signal, which is sent from the camera body B1 to turn on and off the power supply of the lens unit L1 (turned on by H and turned off by L). In the following, a current supplied from the battery and not regulated is referred to as UNREG, and a voltage thereof is referred to as UNREG voltage.

The camera body B1 and the lens unit L1 have A/D converters 23 and 24 respectively to monitor the UNREG voltage. A body-side CPU 25 and a lens-side CPU 26 built in the camera body B1 and the lens unit L1 periodically monitor (perform polling of) output values of the A/D converters 23 and 24 to measure the respective UNREG voltages. In the lens unit L1, it is unnecessary to consider voltage drop cased by the mount contacts 8 and 10 because the voltage having passed through the mount contacts 8 and 10 is monitored.

Flash memories 28 and 29 of the camera body B1 and the lens unit L1 store a body-side PREEND voltage, a lens-side PREEND voltage, a body-side END voltage, a lens-side END voltage and so forth. The PREEND voltages represent the minimum voltages guaranteeing the respective operations of the camera body B1 and the lens unit L1. The END voltages represent the voltages causing halts of the operations. The body-sided and lens-side CPUs 25 and 26 read these voltages to compare them with the UNREG voltages respectively obtained from the A/D converters 23 and 24 as a result of polling.

The camera body B1 and the lens unit L1 are respectively provided with DC/DC converters 31 and 32 to produce prescribed necessary voltage groups from the UNREG voltages. The DC/DC converters 31 and 32 are turned on and off by the body-side CPU 25 and the lens-side CPU 26 from I/O ports 33 and 34 via power-supply controllers 35 and 36. Incidentally, the power-supply controllers 35 and 36 control an activation order, timing and so forth of the respective power-supply voltages of the camera body B1 and the lens unit L1. In this regard, the power-supply voltage of the lens unit L1 is the UNREG voltage supplied from the battery 22 of the camera body B1 via the mount contacts 8 and 10.

Figure 4:
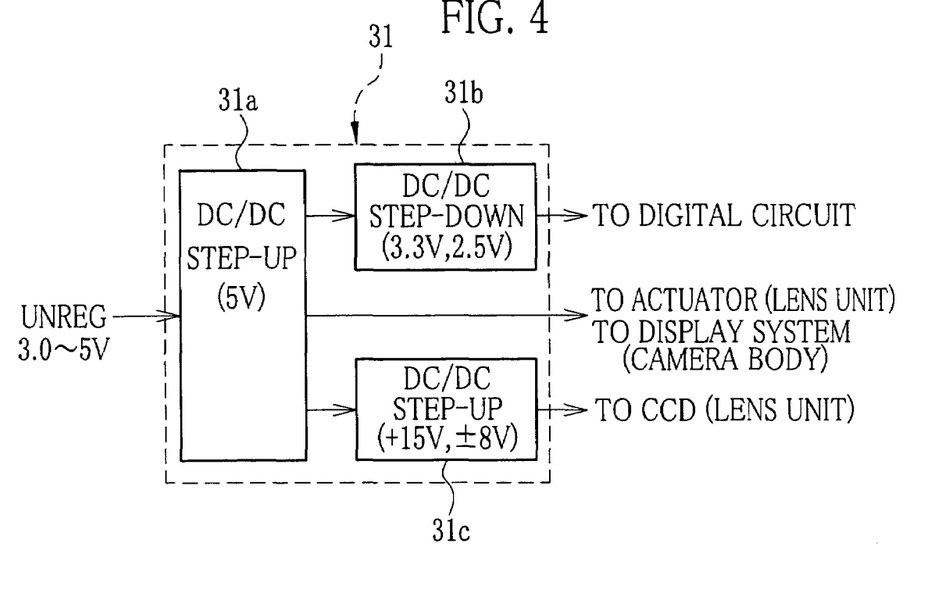
FIG. 4 is a block diagram showing a structure of a DC/DC converter.

Since the DC/DC converters 31 and 32 have an identical structure, only the DC/DC converter 31 is described below. As shown in FIG. 4, the DC/DC converter 31 comprises DC/DC converters 31a, 31b and 31c. The UNREG voltage of 3.0V to 5V inputted into the DC/DC converter 31 is stepped up to 5V by the DC/DC converter 31a and is sent to a display system of the LCD 18 (in the case of the camera body B1) and an actuator (in the case of the lens unit L1). The boosted UNREG voltage is also sent to the DC/DC converters 31b and 31c.

The DC/DC converter 31b steps down the 5V to 3.3V and 2.5V to supply the lowered voltage mainly to a digital circuit. In the meantime, the DC/DC converter 31c steps up the 5V by +15V, ±8V to supply the boosted voltage to the CCD 7 (in the case of the lens unit L1). The DC/DC converter 31 is capable of operating until the minimum voltage (END voltage) 3V by which the first DC/DC converter 31a is capable of operating. In view of this, the PREEND voltage of the DC/DC converter 31 for actually issuing the warning is set to 3.5V so as to be higher than the END voltage of 3V by 0.5V.

Figure 5:
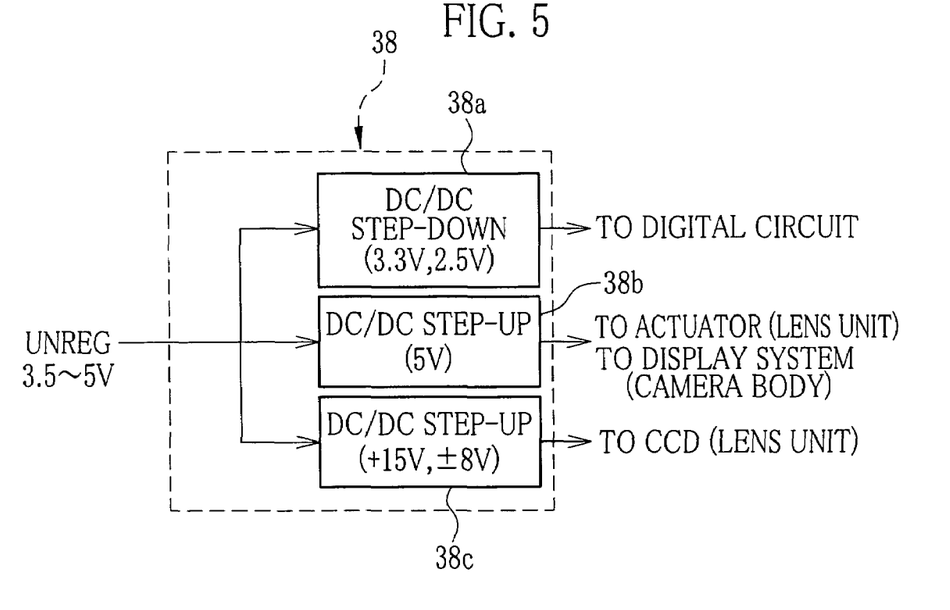
FIG. 5 is a block diagram showing a structure of another DC/DC converter.

As another embodiment of the DC/DC converter 31 and 32, a DC/DC converter 38 shown in FIG. 5 is described below. The DC/DC converter 38 steps down the UNREG voltage, which is within a range of 3.5V to 5V, to 3.3V and 2.5V by a DC/DC converter 38a to supply the lowered voltage mainly to the digital circuit. At the same time, the UNREG voltage of 3.5V to 5V is stepped up by a DC/DC converter 38b to 5V and the boosted voltage is sent to the display system of the LCD (in the case of the camera body B1) and the actuator (in the case of the lens unit L1). Further, a DC/DC converter 38c steps up the UNREG voltage of 3.5V to 5V by +15V, ±8V, and the boosted voltage is supplied to the CCD 7 (in the case of the lens unit L1). As to the DC/DC converter 38, it is necessary to produce 3.3V and 2.5V by stepping down the UNREG voltage. For this reason, the operable minimum voltage (END voltage) of the UNREG voltage is set to 3.5V. The PREEND voltage of the DC/DC converter 38 for actually issuing the warning is set to 4V so as to be higher than the END voltage of 3.5V by 0.5V.

When the DC/DC converters 31 and 38 are compared, the DC/DC converter 31 can set the lower PREEND voltage. However, since the voltage of 3.3V and so forth is produced after the first step-up, electric loss occurs by a little in accordance with efficiency of the first step-up. Meanwhile, although the PREEND voltage of the DC/DC converter 38 is slightly higher than that of the DC/DC converter 31, the DC/DC converter 38 can produce the 3.3V and the 2.5V only by means of step-down. Thus, the DC/DC converter 38 has better efficiency in comparison with the DC/DC converter 31 (generally, efficiency of step-down is better than that of step-up). In other words, the DC/Dc converters 31 and 38 have advantages and disadvantages. It is preferable that these converters are selectively used for the respective types of the lens unit L1 and the camera body B1 in accordance with a sort of a built-in circuit and so forth.

Meanwhile, the camera body B1 is provided with a switch 40 for supplying electricity from the battery 22 to the lens unit L1. The switch 40 is controlled by the body-side CPU 25 via the I/O port 33. When the power-supply voltage of the lens unit L1 has dropped below the END voltage, the switch 40 is turned off to stop supplying the electricity to the lens unit L1 after changing the LU-ON signal to L.

The imaging optical system 6 of the lens unit L1 includes a stop for regulating a light amount, besides the taking lens 5. When subject light forms an image on the CCD 7 by utilizing the taking lens 5, the CCD 7 converts the optical subject image into an electrical image signal to be inputted into an analog signal processor 42.

The analog signal processor 42 performs processing of noise reduction, amplifier and so forth for the image signal. After that, the processed image signal is inputted into an A/D converter circuit 43, which converts the analog image signal into a digital image signal (raw data of R, G and B). The converted digital image signal is inputted into an integration circuit 44 and a digital signal processor 45. The camera system 1 described below is set to the still-image shooting mode by handling the mode switching dial 15.

The integration circuit 44 measures subject brightness (to be used for AE) and a subject distance (to be used for AF). Measurement data is transferred via a data bus 46 to the stop of the imaging optical system 6 and to a stop/focus/zoom controller 48, which performs focus adjustment and zooming.

Figure 6:
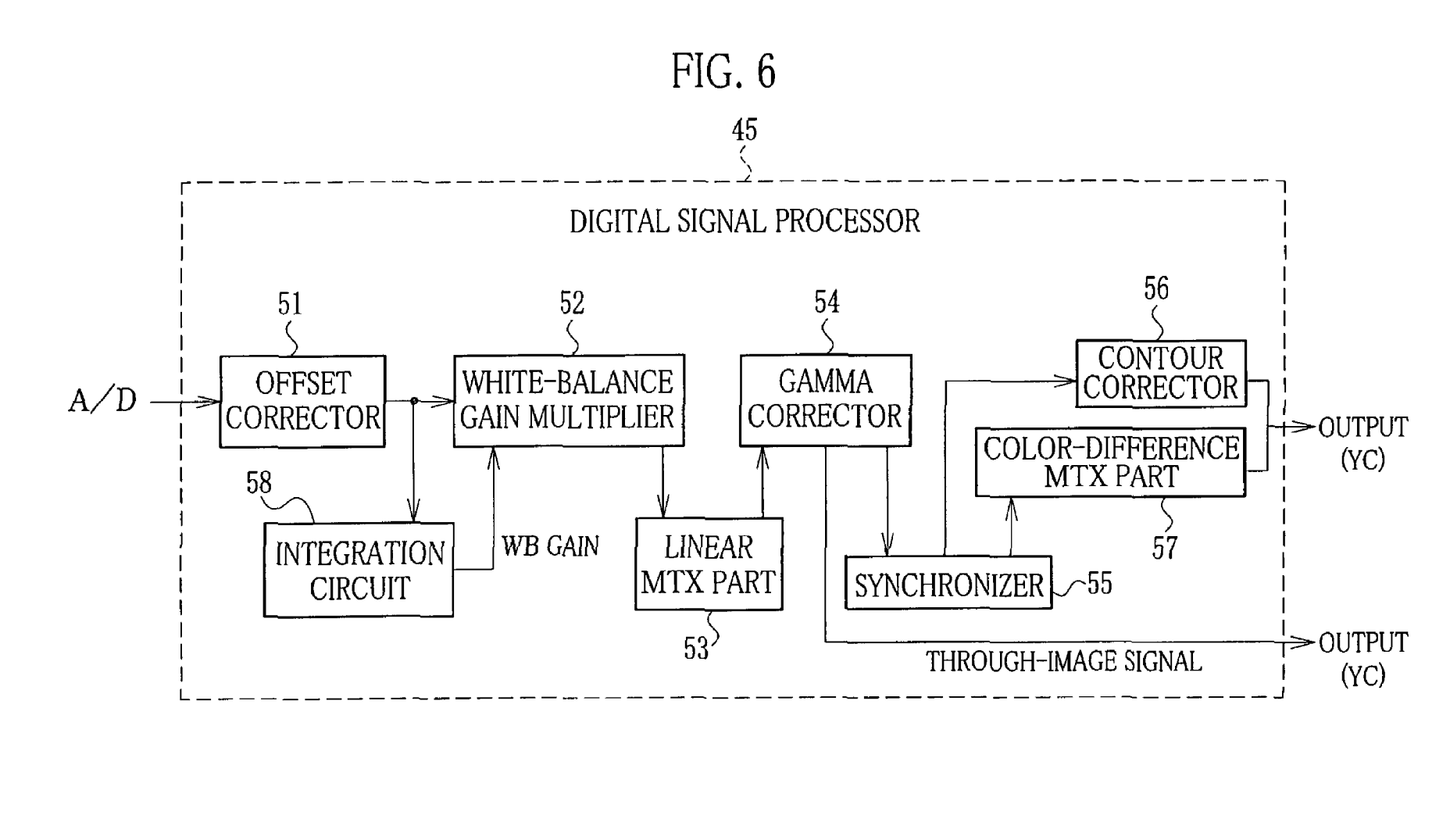
FIG. 6 is a block diagram showing a structure of a digital signal processor.

Processing performed for the image signal inputted into the digital signal processor 45 is described below with reference to FIG. 6. The digital signal processor 45 comprises an offset corrector 51, a white-balance (WB) gain multiplier 52, a linear matrix (linear MTX) part 53, a gamma corrector 54, a synchronizer 55, a contour corrector 56, a color-difference MTX part 57 and an integration circuit 58.

When the image signal is used for displaying a through image, a dynamic range of the offset corrector 51 is adjusted and gains of R, G and B signals of the WB gain multiplier 52 are adjusted for the purpose of obtaining high-purity white. Moreover, conversion to a YCrCb signal is performed in the linear MTX part 53. Further, a YC data obtained after brightness adjustment of the gamma corrector 54 is transferred to an LVDS transmitter 60 (see FIG. 3). Meanwhile, the integration circuit 58 integrates R, G and B components of the image signal, which is outputted from the offset corrector 51, to obtain gain values thereof. The obtained gain value is sent to the WB gain multiplier 52.

To the WB gain multiplier 52 and the integration circuit 58, is set a number of pixels as a parameter. The number of pixels is designated under the setup mode described later. A matrix coefficient of a color conversion matrix is set to the linear MTX part 53 as a parameter in accordance with setting of tone and saturation. Further, a matrix coefficient for edge emphasis is set to the contour corrector 56 as a parameter in accordance with setting of sharpness and so forth. After setting the parameters, processing is performed in the respective parts.

The LVDS transmitter 60 sends the YC data to a LVDS receiver 61 of the camera body B1 via the mount contacts 8 and 10. The YC data sent to the LVDS receiver 61 is forwarded to a frame memory 64 every predetermined time. And then, the YC data is transferred to the LCD 18 via an LCD driver 65 and is displayed thereon as a through image.

The YC data is 8-bit data in a normal color space (identical with color spaces taken before and after JPEG compression). The YC data is independent from a kind of the CCD and a kind of image processing. Thus, it is unnecessary in the camera body B1 to perform specific processing relative to the respective lens units L1 to Ln of different kinds so that compatibility of the data is secured.

When the release button 14 has been fully depressed, processes identical with those of the through-image signal are performed between the analog signal processor 42 and the gamma corrector 54 of the digital signal processor 45 to produce the YC data. The produced YC data is synchronized by the synchronizer 55. Then, a Y-signal is supplied to the contour corrector 56 and a color signal (C) is supplied to the color-difference MTX part 57.

In the contour corrector 56, edge emphasis is performed for the Y-signal. In the color-difference MTX part 57, the C-signal is converted into a color-difference signal. The LVDS transmitter 60 sends the Y-signal and the color-difference signal (YC data) to the LVDS receiver 61 of the camera body B1 through the mount contacts 8 and 10. The YC data is written in a memory 70 via a data bus 68 of the camera body B1. After that, resize processing and electronic-zoom processing are performed for the YC data in a signal processor 71, and the YC data is compressed (in JPEG format, for instance) in a companding processor 72. And then, the YC data is written in the memory card 76 via a card interface (card I/F) 74 and a memory card slot 75.

The CCD 7, the analog signal processor 42, the A/D converter circuit 43 and the integration circuit 44 are operated in synchronism with a timing signal outputted from a timing generator (hereinafter referred to as TG) 78. An operation of the TG 78 is controlled by the lens-side CPU 26. Along a procedure of software stored in a system memory 80, the lens-side CPU 26 controls the respective parts of the lens unit L1. Concretely, the lens-side CPU 26 controls the operations of the TG and the stop/focus/zoom controller, a read/write operation of the flash memory 29, an operation of a UART 81 for performing the UART communication, and so forth.

The body-side CPU 25 controls the respective parts of the camera body B1 along a procedure of software stored in a system memory 82. The camera body B1 is provided with a UART 83, a timer 84, a calendar clock 85, a USB driver 86, a USB connector 87, switch/LED 88 and so forth. The UART 83 performs the UART communication with the UART 81. The timer 84 and the calendar clock 85 produce data for displaying a time and date information on a screen of the LCD 18. The USB driver 86 and the USB connector 87 are used for connection with an external equipment. The switch/LED 88 is used for inputting various instructions. The operational instruction of the switch/LED 88 is forwarded to the body-side CPU 25 via an I/O port 89, and the body-side CPU 25 performs processing in accordance with the forwarded operational instruction. By the way, the release button 14 is directly connected to interruption terminals of both the body-side CPU 25 and the lens-side CPU 26. Upon depression of the release button 14, both the CPUs 25 and 26 are interrupted to start either one of a still-image processing program and a moving-image processing program.

Upon full depression of the release button 14, a flash controller 91 controls a flash device 92 in accordance with a light amount of shooting conditions to emit a flashlight from the flash emitter 16 toward a subject. Incidentally, the flash device 92 includes the flash emitter 16.

In performing the moving-image shooting, the mode switching dial 15 is handled to set the moving-image shooting mode. After that, the release button 14 is depressed. The image signal of the moving image is sent from the lens unit L1 to the camera body B1 in the state of the YC data through a route identical to that of the image signal of the still image, and the image signal of the moving image is stored in the memory 70. Then, the body-side CPU 25 reads the YC data out of the memory 70. Further, a moving-image compressing process (MPEG-2, for instance) is performed in the companding processor 72. The processed image is written in the memory card 76 via the card I/F 74 and the memory slot 75.

Figure 7:
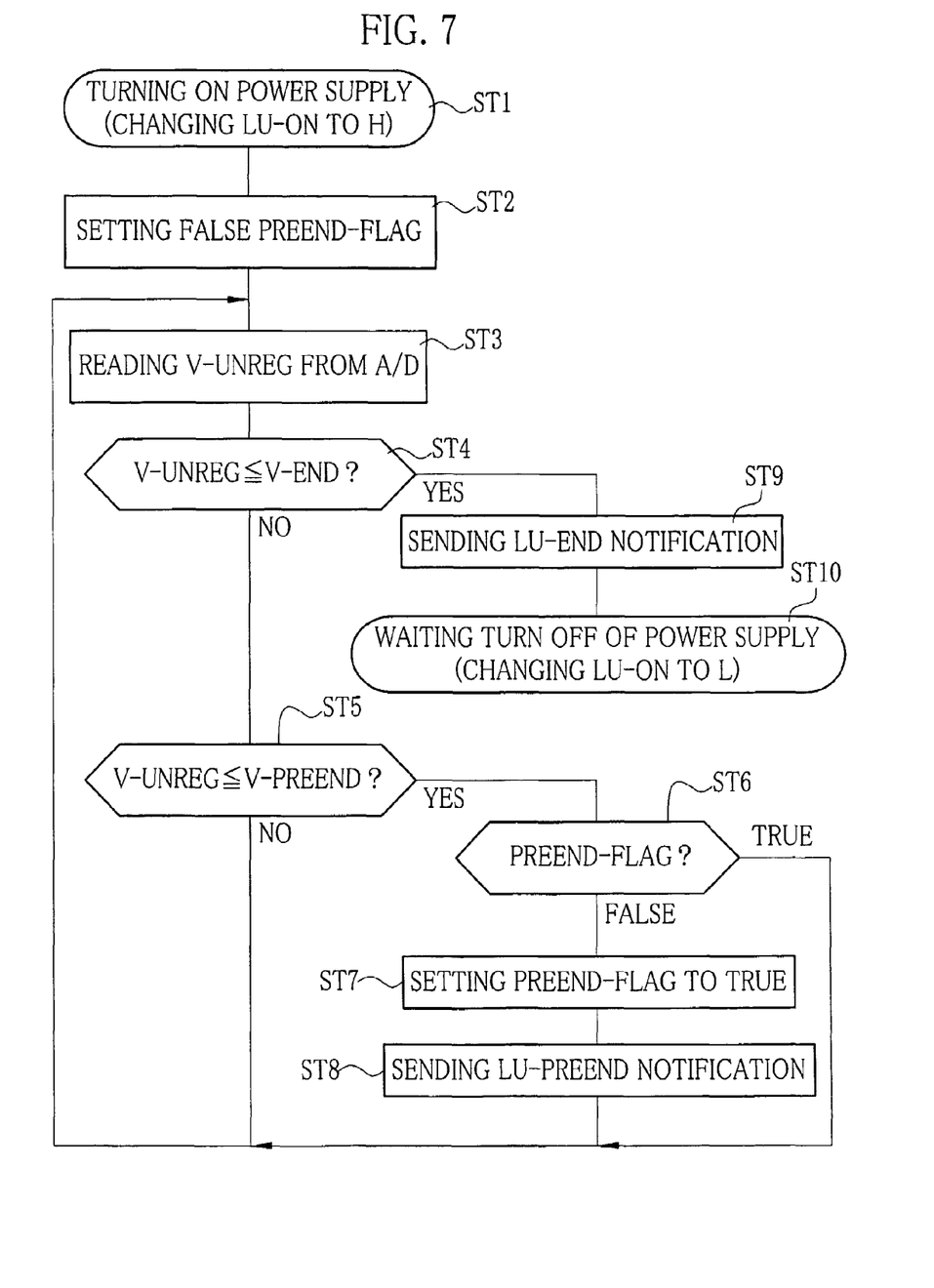
FIG. 7 is a flowchart showing a power-supply monitoring process of a lens unit of the first embodiment.

An operation of the first embodiment having the above structure is described below. FIG. 7 shows a flowchart for monitoring the power supply of the lens unit L1. In FIG. 7, the power switch 19 is operated first to turn on the power supply (ST1). Upon this, the LU-ON signal is changed to H and the electricity is supplied from the battery 22 to the lens unit L1 through the mount contacts 8 and 10. The lens-side CPU 26 sets a false PREEND-flag for initialization (ST2). Successively, the lens-side CPU 26 reads the UNREG voltage (V-UNREG) from the A/D converter 24 (ST3), and compares the read voltage with the END-voltage (V-END) of the lens side (ST4).

When the UNREG voltage is higher than the END voltage, the UNREG voltage is compared with the PREEND voltage (V-PREEND) (ST5). In a case that the UNREG voltage is higher than the PREEND voltage, it is possible to perform the operation as it is, and monitoring (polling) is continued. In a case that the UNREG voltage is equal to or less than the PREEND voltage, whether the PREEND-flag is false or not is checked (ST6).

When the PREEND-flag is false, the lens-side CPU 26 changes the PREEND-flag to true (ST7). After that, the lens-side CPU 26 sends an LU-PREEND notification, which informs that the UNREG voltage is equal to or less than the PREEND voltage, to the body-side CPU 25 by means of the UART communication of the UARTs 81 and 83.

After changing the PREEND-flag to true, the PREEND-flag is always set to true unless the power switch 19 is turned off and on. Consequently, the UNREG voltage is compared with the END voltage by polling without sending the LU-PREEND notification (ST4).

When the UNREG voltage is equal to or less than the END voltage (ST4), an LU-END notification informing this state is sent to the body-side CPU 25 by means of the UART communication. The lens-side CPU 26 waits until the body-side CPU 25 having received the LU-END notification changes the LU-ON signal to L to turn off the power supply of the lens unit L1.

Figure 8:
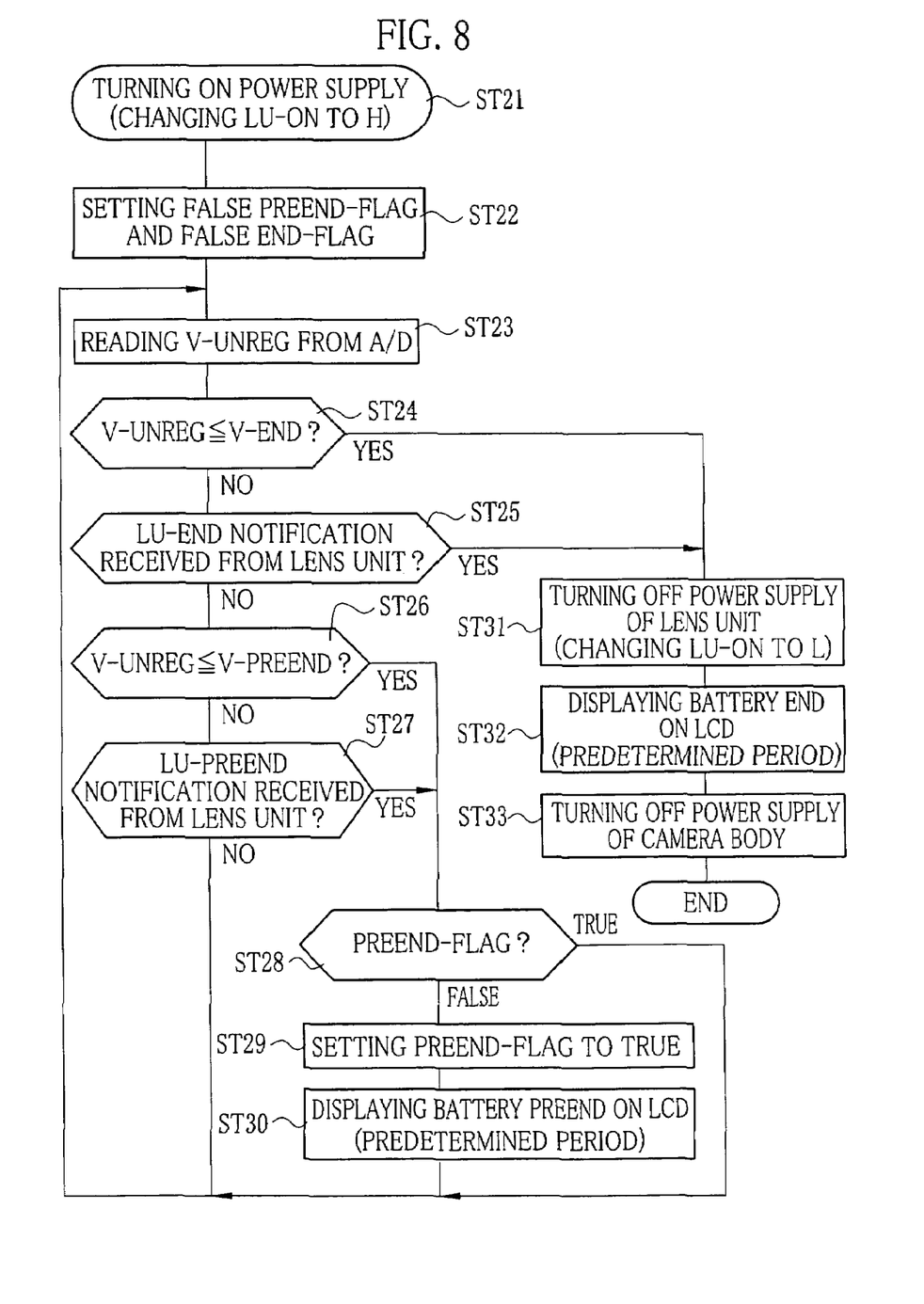
FIG. 8 is a flowchart showing a power-supply monitoring process of a camera body of the first embodiment.

FIG. 8 shows a flowchart for monitoring the power supply of the camera body B1. In FIG. 8, when the power switch 19 has been handled to turn on the power supply (ST21), the electricity is supplied from the battery 22 to the respective parts of the camera body B1. At the same time, the LU-ON signal is changed to H and the electricity is supplied to the lens unit L1 as well via the mount contacts 8 and 10.

The body-side CPU 25 sets the false PREEND-flag and the false END-flag for initialization (ST22). Successively, the body-side CPU 25 reads the UNREG voltage (V-UNREG) out of the A/D converter 23 (ST23). The read voltage is compared with the END voltage (V-END) of the body side (ST24).

In a case that the UNREG voltage is higher than the END voltage (ST24), whether the LU-END notification is received or not from the lens unit L1 is checked (ST25). Incidentally, this check is periodically performed. When the LU-END notification is not received from the lens unit L1, the body-side CPU 25 compares the UNREG voltage with the PREEND voltage (V-PREEND) of the body side (ST26). When the UNREG voltage is higher than the PREEND voltage, whether the LU-PREEND notification is received or not from the lens unit L1 is checked (ST27). In a case that this notification is not received, it is possible to perform the operation as it is, and monitoring (polling) is continued.

When the UNREG voltage is equal to or less than the PREEND voltage (ST26) or when the LU-PREEND notification is received from the lens unit L1 (ST27), whether the PREEND-flag is false or not is checked (ST28). If the PREEND-flag is false, the body-side CPU 25 changes the PREEND-flag to true (ST29). After that, the warning informing that the UNREG voltage is equal to or less than the PREEND voltage is displayed on the LCD 18 for a predetermined period (ten seconds, for instance) (ST30). The warning is displayed such as "Remaining battery is small" or the like.

After changing the PREEND-flag to true, the PREEND-flag is always set to true unless the power switch 19 is turned off and on. Consequently, the UNREG voltage is compared with the END voltage by polling without performing the warning display.

When the UNREG voltage is equal to or less than the END voltage (ST24) or when the LU-END notification is received from the lens unit L1 (ST25), the body-side CPU 25 changes the LU-ON signal to L and turns off the switch 40 to stop supplying the electricity to the lens unit L1 (ST31). And then, warning informing that the UNREG voltage is equal to or less than the END voltage is displayed on the LCD 18 for a predetermined period (five seconds, for instance) (ST32). The warning is displayed such as "Battery runs out" or the like. After that, the body-side CPU 25 instructs the power-supply controller 35 to turn off the power supply of the camera body B1 (ST33).

Figure 9:
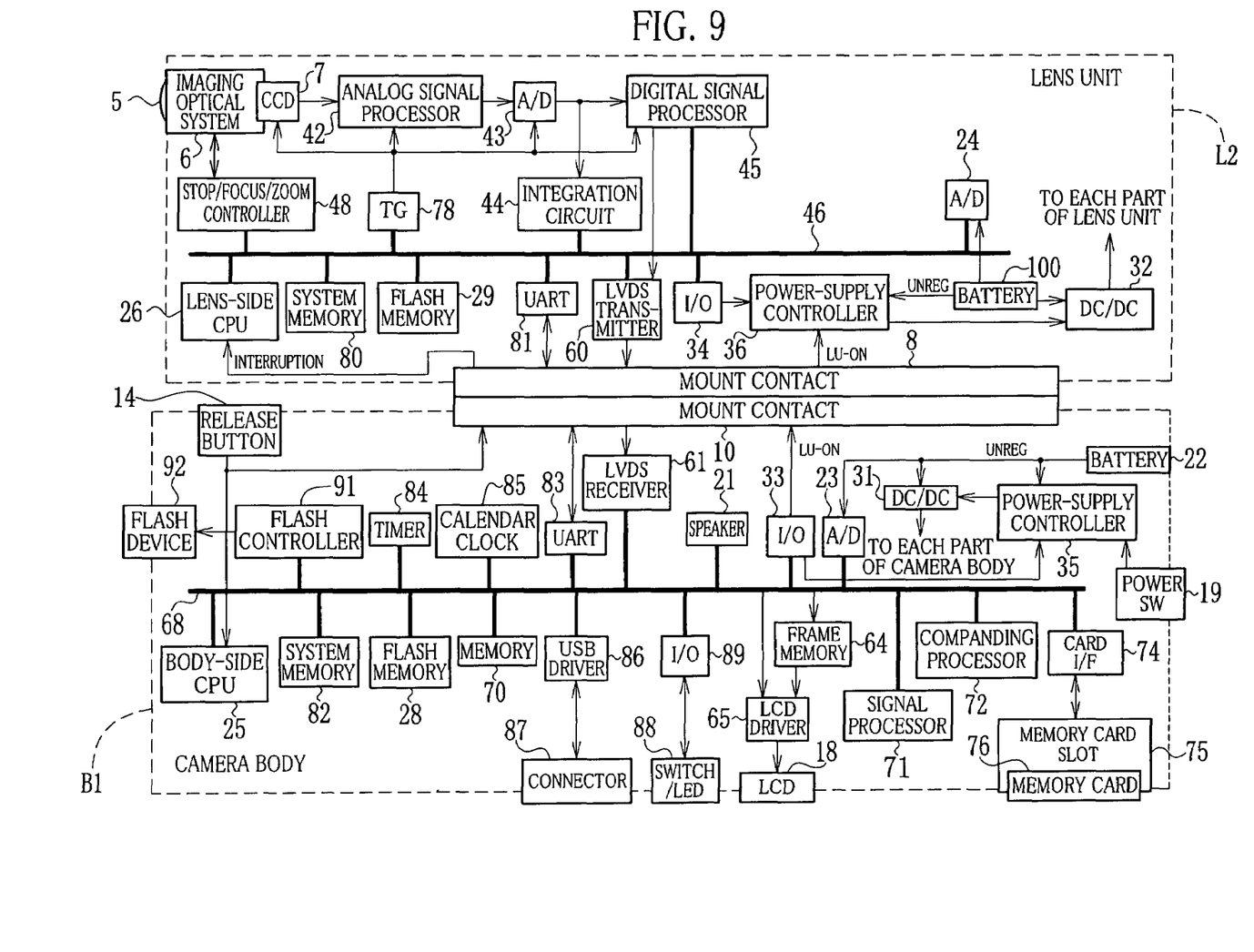
FIG. 9 is a block diagram showing an electrical structure of the camera system of the second embodiment.

Next, the second embodiment of the present invention is described below. Incidentally, a member identical with that of the first embodiment is denoted by the same reference numeral and description thereof is abbreviated. As shown in FIG. 9, a lens unit L2 and the camera body B1 are loaded with a battery 100 and the battery 22 respectively. The lens unit L2 manages the power supply independently from the camera body B1. When a voltage of the battery 100 lowers and reaches the PREEND voltage and the END voltage, warning is displayed on the LCD 18 of the camera body B1. In the second embodiment, it is possible to make up a power-supply system in which the UNREG voltage of the lens unit L2 is considerably different from that of the camera body B1. For example, the camera body has a power supply of a single lithium-ion battery and the lens unit L2 has a power supply of two lithium-ion batteries serially connected.

Figure 10:
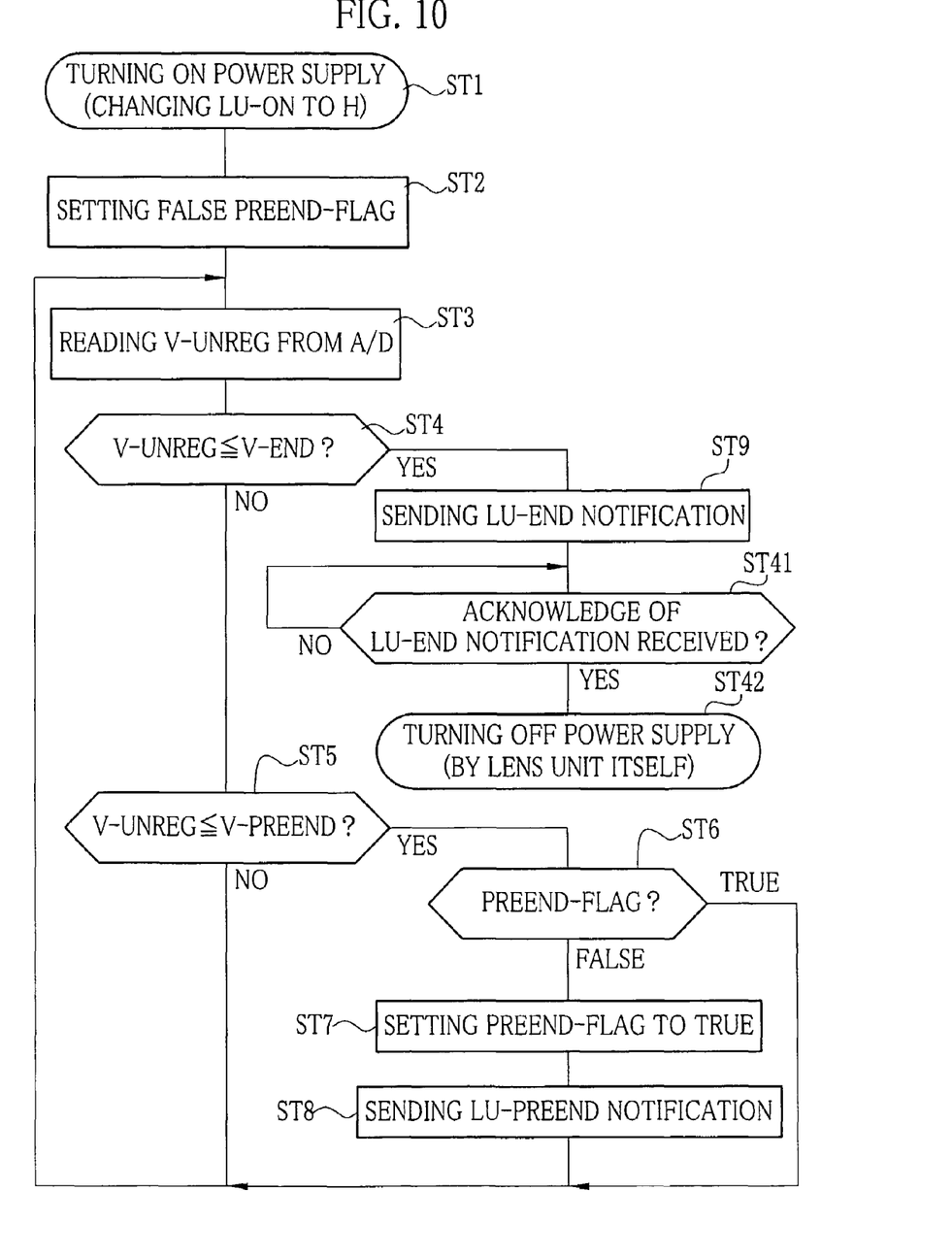
FIG. 10 is a flowchart showing a power-supply monitoring process of the lens unit of the third embodiment.

Next, the third embodiment of the present invention is described below. A structure of the third embodiment is similar to that of the first embodiment. As shown in a flowchart of FIG. 10, when the UNREG voltage is equal to or less than the END voltage in the lens unit L1 (ST4), the LU-END notification informing this state is sent to the body-side CPU 25 by means of the UART communication (ST9). And then, the lens-side CPU 26 receives an acknowledge signal, which is a response to the LU-END notification, from the camera body B1 (ST41). At this time, the lens-side CPU 26 instructs the power-supply controller 36 to turn off the power supply of the lens unit L1 by itself (ST42).

Figure 11:
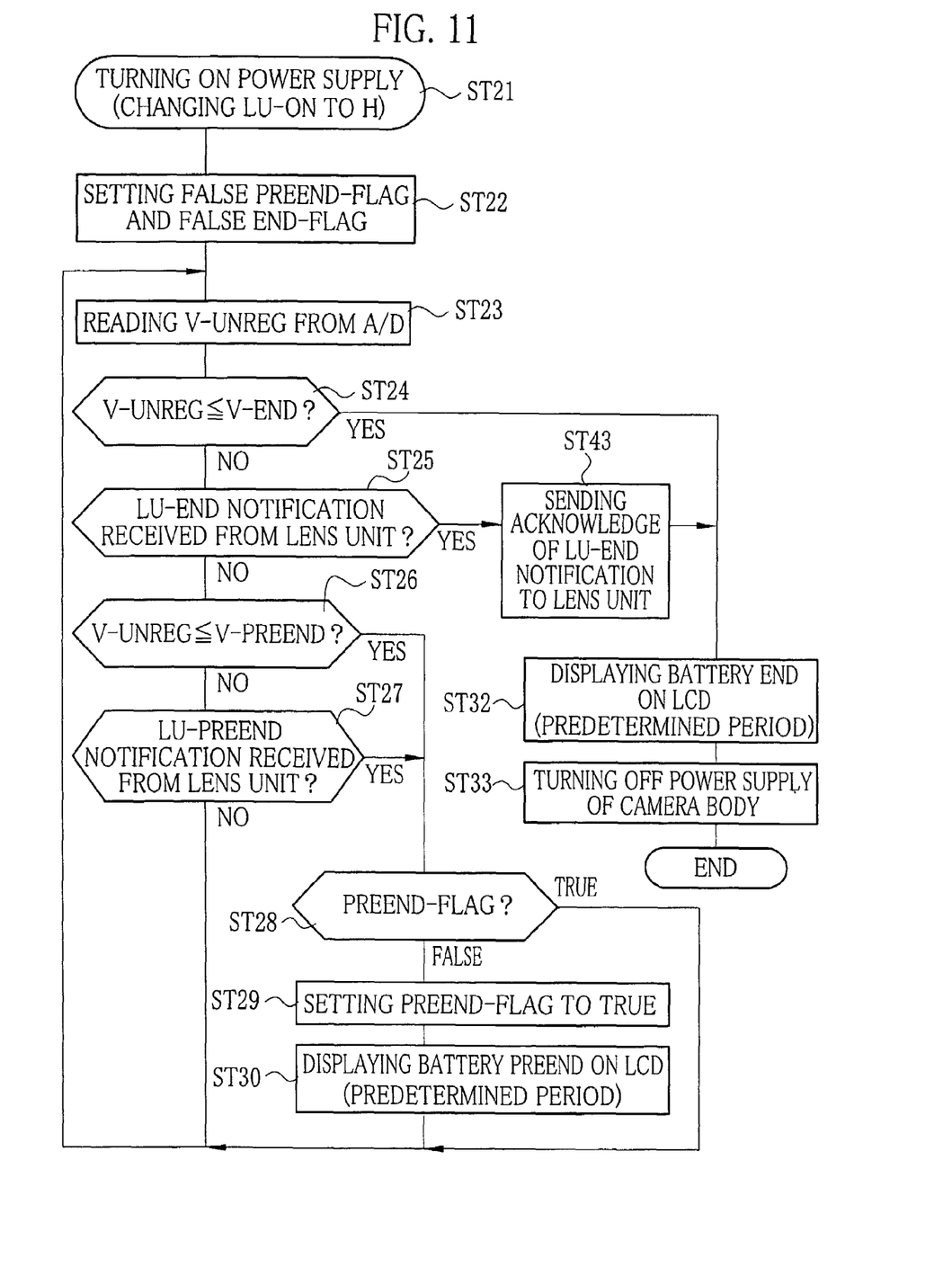
FIG. 11 is a flowchart showing a power-supply monitoring process of the camera body of the third embodiment.

As shown in a flowchart of FIG. 11, when the UNREG voltage is higher than the END voltage in the camera body B1 (ST24) and the camera body B1 receives the LU-END notification from the lens unit L1 (ST25), the body-side CPU 25 sends an acknowledge signal, which is a response to the LU-END notification, to the lens-side CPU 26 (ST43). Upon this, as described above, the lens-side CPU 26 turns off the power supply of the lens unit L1 by itself (ST42). After that, the body-side CPU 25 displays the warning such as "Battery runs out" or the like on the LCD 18 for a predetermined period (five seconds, for instance) (ST32), and the body-side CPU 25 instructs the power-supply controller 35 to turn off the power supply of the camera body B1 (ST33). By the way, the structure of the third embodiment is identical with that of the first embodiment, but may be identical with that of the second embodiment.

In the above-described first to third embodiments, it is possible to accurately perform the monitoring of the power supply even when the lens units L1 to Ln have the different END voltages and the different PREEND voltages and even when the END voltages and the PREEND voltages of the lens units L1 to Ln are different from those of the camera body B1. Moreover, it is possible to accurately perform the monitoring of the power supply even if contact resistance of the contact point changes due to deterioration of the mount contact with time, wear thereof, change of pressing force thereof, and so forth.

In the above-described embodiments, the UNREG voltage is obtained by polling. The present invention, however, is not limited to this. The UNREG voltage outputted from the A/D converter may be compared with the END voltage and the PREEND voltage, which are read out of the flash memory, by means of hardware, and the CPU may be interrupted by an output of the hardware. Further, in the above embodiments, the UNREG voltage is compared with both of the END voltage and the PREEND voltage. However, the UNREG voltage may be compared with only one of the voltages, for example only the PREEND voltage, to recommend charging and exchange of the battery.

The warnings used in the above embodiments are mere examples. It is needless to say that other warnings may be used. The period for displaying the warning is not limited to ten seconds and five seconds. Especially, when the UNREG voltage is equal to or less than the V-END voltage, it is preferable that the period for displaying the warning is shorter so as to prevent the battery from completely becoming empty. If the battery completely becomes empty, it is impossible to display the warning. The period for displaying the warning is sufficient to be two to three seconds, for instance. Meanwhile, the warning display is not limited to the sentences. It is considered to blink an illustration of the battery. Alternatively, a buzzer (not shown) may be sounded. In the foregoing embodiments, the camera system is applied to the electronic camera. The present invention, however, is not limited to this and may be applied to a camera-equipped cell-phone and a movie camera.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera system comprising a lens unit and a camera body to which said lens unit is detachably attached via a mount, said lens unit including an image sensor for converting an optical image formed by a taking lens into an image signal, and said camera body including a power source, said camera system comprising:

(A) said lens unit comprising:

a lens-side voltage-measuring part for measuring a voltage of electric power supplied from said power source of said camera body via a mount contact provided on said mount;

a lens-side memory for storing a lens-side threshold voltage, which guarantees an operation of said lens unit, in advance;

a lens-side voltage-comparing part for comparing a measured voltage of said lens-side voltage-measuring part with said lens-side threshold voltage read out of said lens-side memory; and a lens-side communication part for sending a lens-side comparison result of said lens-side voltage-comparing part to said camera body via said mount contact, (B) said camera body comprising:

a body-side communication part for receiving said lens-side comparison result sent from said lens-side communication part; and a display for showing said lens-side comparison result.

2. The camera system according to claim 1, wherein a warning is indicated on said display on the basis of said lens-side comparison result when said measured voltage is equal to or less than said lens-side threshold voltage.

3. The camera system according to claim 1, wherein said camera body sends an acknowledge signal of said lens-side comparison result to said lens unit via said body-side communication part when receiving said lens-side comparison result, which represents that said measured voltage is equal to or less than said lens-side threshold voltage, via said body-side communication part, and said lens unit stops supplying the electric power of said power source of said camera body to each part of said lens unit after receiving said acknowledge signal via said lens-side communication part.

4. The camera system according to claim 1, wherein said lens unit and said camera body further include image-transfer communication parts which are used for transferring said image signal to said camera body and are provided separately from said lens-side communication part and said body-side communication part.

5. The camera system according to claim 1, wherein said lens-side threshold voltage is a minimum operating voltage enabling said lens unit to operate.

6. The camera system according to claim 1, wherein said lens-side threshold voltage is a voltage set so as to be higher than a minimum operating voltage, which enables said lens unit to operate, by a predetermined value.

7. The camera system according to claim 1, wherein showing said comparison result is performed for a predetermined period.

* * * * *